United States Patent
Ohmura

(10) Patent No.: US 10,994,726 B2
(45) Date of Patent: May 4, 2021

(54) VEHICLE CONTROL SYSTEM

(71) Applicant: MAZDA MOTOR CORPORATION, Hiroshima (JP)

(72) Inventor: Hiroshi Ohmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 47 days.

(21) Appl. No.: 16/343,295

(22) PCT Filed: Oct. 19, 2017

(86) PCT No.: PCT/JP2017/037816
§ 371 (c)(1),
(2) Date: Apr. 18, 2019

(87) PCT Pub. No.: WO2018/074541
PCT Pub. Date: Apr. 26, 2018

(65) Prior Publication Data
US 2019/0256086 A1 Aug. 22, 2019

(30) Foreign Application Priority Data

Oct. 21, 2016 (JP) .............................. JP2016-206748
Oct. 21, 2016 (JP) .............................. JP2016-206749
Oct. 21, 2016 (JP) .............................. JP2016-206750

(51) Int. Cl.
*B60W 30/09* (2012.01)
*B60W 10/04* (2006.01)
(Continued)

(52) U.S. Cl.
CPC .............. *B60W 30/09* (2013.01); *B60T 7/12* (2013.01); *B60W 10/04* (2013.01); *B60W 10/18* (2013.01);
(Continued)

(58) Field of Classification Search
CPC ...... B60W 30/09; B60W 10/04; B60W 10/18; B60W 10/20; B60W 30/095; B60W 30/143; B60T 7/12; G08G 1/16
(Continued)

(56) References Cited

U.S. PATENT DOCUMENTS 8,364,366 B2 * 1/2013 Foessel ................. B60W 30/09
701/70

FOREIGN PATENT DOCUMENTS

JP 2006-218935 A 8/2006
JP 2016-206748 A 1/2010
(Continued)

OTHER PUBLICATIONS

International Search Report issued in PCT/JP2017/037816; dated Dec. 26, 2017.
(Continued)

*Primary Examiner* — Isaac G Smith
(74) *Attorney, Agent, or Firm* — Studebaker & Brackett PC

(57) ABSTRACT

An ECU (10) is configured to: detect a preceding vehicle (3) ahead of the vehicle (1), and set a speed distribution zone (40) defining a distribution of an allowable upper limit ($V_{lim}$) of a relative speed of the vehicle (1) with respect to the preceding vehicle (3) in a region around the preceding vehicle (3); and, execute traveling control of preventing the relative speed of the vehicle (1) with respect to the preceding vehicle (3) from exceeding the allowable upper limit ($V_{lim}$) in the speed distribution zone (40), wherein the speed distribution zone (40) includes: an allowable upper limit-zero zone (44) where the allowable upper limit becomes zero; and an entry prohibition zone (42) where entry of the vehicle (1) thereinto is prohibited.

18 Claims, 6 Drawing Sheets

(51) Int. Cl.
  *B60W 10/18* (2012.01)
  *B60W 10/20* (2006.01)
  *B60T 7/12* (2006.01)
  *G08G 1/16* (2006.01)
  *B60W 30/095* (2012.01)
  *B60W 30/14* (2006.01)

(52) U.S. Cl.
  CPC .......... *B60W 10/20* (2013.01); *B60W 30/095* (2013.01); *B60W 30/143* (2013.01); *G08G 1/16* (2013.01); *B60W 2554/00* (2020.02); *B60W 2554/4041* (2020.02); *B60W 2554/801* (2020.02); *B60W 2554/804* (2020.02); *B60W 2710/18* (2013.01); *B60W 2710/20* (2013.01); *B60W 2720/106* (2013.01); *B60W 2754/30* (2020.02)

(58) Field of Classification Search
  USPC .......................................................... 701/70
  See application file for complete search history.

(56) References Cited

FOREIGN PATENT DOCUMENTS

| | | | |
|---|---|---|---|
| JP | 2011-225003 A | | 11/2011 |
| JP | 2011225003 A | * | 11/2011 |
| WO | 2016/024318 A1 | | 2/2016 |
| WO | WO-2016024318 A1 | * | 2/2016 ............ B60W 30/08 |

OTHER PUBLICATIONS

Office Action issued in JP 2016-206748; mailed by the Japanese Patent Office dated Dec. 25, 2017.
Office Action issued in JP 2016-206749; mailed by the Japanese Patent Office dated Dec. 25, 2017.
Office Action issued in JP 2016-206750; mailed by the Japanese Patent Office dated Dec. 25, 2017.
International Preliminary Report on Patentability and Written Opinion issued in PCT/JP2017/037816; dated Apr. 23, 2019.

* cited by examiner

VEHICLE CONTROL SYSTEM

TECHNICAL FIELD

The present invention relates to a vehicle control system, and more particularly to a vehicle control system for supporting traveling of a vehicle.

BACKGROUND ART

The Patent Document 1, for example, stated below describes a conventional vehicle traveling support system. The vehicle traveling support system described in the Patent Document 1 is operable to set a safe distance between an own vehicle and an object, and to execute vehicle deceleration control, steering control or the like when a predicted closest approach distance between the own vehicle and the object is less than the safe distance. Here, the safe distance is set as a minimum vehicle-object distance which is deemed to enable the vehicle to avoid contact/collision with the object even when most closely approaching the object by means of steering and/or braking of the vehicle performed by driver's manipulation and/or automatic control. That is, this vehicle traveling support system is operable, even when the own vehicle most closely approaches the object, to control steering/braking such that the safe distance is ensured with respect to the object, so that, even in the event of an unexpected action, e.g., sudden stop of a moving object, it is possible to avoid collision with the object.

CITATION LIST

Patent Document

Patent Document 1: JP 006-218935A

SUMMARY OF INVENTION

Technical Problem

However, in performing the avoidance of collision with the object by the above vehicle traveling support system, when the own vehicle is stopped at a position fairly close to the object or steered to pass through a position fairly close to the object, a passenger of the vehicle may feel unsafe, i.e., to be unable to feel secure and safe.

The present invention has been made to solve the above problem, and an object thereof is to provide a vehicle control system for driving support capable of enabling a passenger to feel more secure and safe.

Solution to Technical Problem

In order to achieve the object, the present invention provides a vehicle control system which is mounted on a vehicle and configured to: detect an object ahead of the vehicle; set, in a region around the object, a speed distribution zone defining a distribution of an allowable upper limit of a relative speed of the vehicle with respect to the object existing in a traveling direction of the vehicle; and execute traveling control of preventing the relative speed of the vehicle with respect to the object from exceeding the allowable upper limit in the speed distribution zone, wherein the speed distribution zone includes: an allowable upper limit-zero zone where the allowable upper limit becomes zero at a position away from the object by a given distance; and an entry prohibition zone where entry of the vehicle thereinto is prohibited at a position closer to the object than the relative speed-zero zone.

In the vehicle control system of the present invention having the above feature, the speed distribution zone is set in at least a part of a region around the object. Then, the vehicle control system operates to control to prevent the relative speed of the vehicle with respect to the object from exceeding the allowable upper limit thereof set in the speed distribution zone. Here, the speed distribution zone has a distribution of the allowable upper limit of the relative speed of the vehicle with respect to the object, and includes the allowable upper limit-zero zone and the entry prohibition zone at respective positions away from the object by given distances. Thus, for example, when the vehicle approaches the object and enters the allowable upper limit-zero zone, the allowable upper limit of the relative speed is controlled to become zero, whereby the vehicle does not approach the object any more. In this way, the vehicle control system can support safe vehicle driving.

Further, the entry prohibition zone is set with respect to the object. Thus, even if the vehicle further approaches the object within the allowable upper limit-zero zone due to an unexpected action of the object, etc., the vehicle is subjected to brake/steering control to prevent the vehicle from entering the entry prohibition zone. Therefore, even when the brake/steering control is executed for avoiding collision, a given distance can be ensured between the vehicle and the object, so that it becomes possible to support secure and safe driving without causing a passenger to feel unsecure.

Preferably, in the present invention, the entry prohibition zone is set such that it varies according to a movement speed of the object.

According to this feature, the entry prohibition zone is set such that it varies according to the movement speed of the object. Here, when ensuring the distance and speed between the vehicle and the object which allow a passenger of the vehicle to feel secure and safe, it is found that the vehicle-object distance and the speed which allow the passenger to feel safe vary according to the movement speed of the object. Therefore, by setting the entry prohibition zone such that it varies according to the movement speed of the object, it becomes possible to realize driving assist which ensures the vehicle-object distance and the speed conforming to feeling of a passenger and enables the passenger to feel secure and safe.

Preferably, in the present invention, the entry prohibition zone is set such that a distance extending rearwardly from a rear end of the object is greater than a distance extending forwardly from a front end of the object.

According to this feature, the entry prohibition zone is set such that the distance extending rearwardly from the rear end of the object is greater than the distance extending forwardly from the front end of the object. Here, for example, in a situation where the vehicle is traveling behind the object, the vehicle will travel to approach the object. In this situation, the vehicle-object distance can be easily controlled by the traveling speed or traveling course of the own vehicle. Thus, even when the vehicle-object distance is relatively small, a passenger can feel it as a safe distance. On the other hand, in a situation where the vehicle overtakes the object and travels ahead of the object, the object can move to approach the vehicle from behind the vehicle. For this reason, in order to enable a passenger of the vehicle to feel a vehicle-object distance safe, it is necessary to ensure a relatively large vehicle-object distance, in view of the possibility that the object moves to approach the vehicle.

Therefore, the entry prohibition zone is preferably set such that the distance extending rearwardly from the rear end of the object is greater than the distance extending forwardly from the front end of the object. This makes it possible to realize driving support capable of ensuring the vehicle-object distance and the speed conforming to feeling of the passenger to enable the passenger to feel secure and safe.

Preferably, in the present invention, the speed distribution zone is set for a region behind the object at a position farther away from the object than the relative speed-zero zone, such that the allowable upper limit becomes lower as a longitudinal distance from the object to the vehicle in the traveling direction of the vehicle becomes smaller.

According to this feature, the speed distribution zone is set for a region behind the object such that the allowable upper limit becomes lower as the longitudinal distance becomes smaller. Therefore, when the vehicle approaches the object from behind the object, the allowable upper limit becomes lower as the vehicle approaches the object. Thus, even in this situation, it becomes possible to drive the vehicle at the relative speed which allows a driver to feel safe.

Preferably, in the present invention, the speed distribution zone is set for a region lateral to the object at a position farther away from the object than the relative speed-zero zone, such that the allowable upper limit becomes lower as a lateral distance from the object to the vehicle existing in the traveling direction of the vehicle becomes smaller.

According to this feature, the speed distribution zone is set for the region lateral to the object such that the allowable upper limit becomes lower as the lateral distance becomes smaller. Therefore, for example, when the vehicle passes or overtakes laterally beside the object, the allowable upper limit becomes lower as the vehicle passes through a position closer to the object. Thus, even in this situation, it becomes possible to drive the vehicle at the speed which allows a passenger to feel safe.

Preferably, it is configured to control a traveling speed of the vehicle such that the vehicle moves to a position farther away from the object than the relative speed-zero zone when the vehicle enters the relative speed-zero zone.

According to this feature, when the vehicle enters the relative speed-zero zone, the vehicle is controlled to move to a position farther away from the object than the relative speed-zero zone. Therefore, it is possible to reliably ensure the vehicle-object distance. This makes it possible to realize driving support capable of enabling a passenger to feel the vehicle-object distance safe.

Preferably, it is configured to set a target traveling course of the vehicle outside the entry prohibition zone so as to move the vehicle out of the relative speed-zero zone when the vehicle enters the relative speed-zero zone.

According to this feature, even when the vehicle enters the relative speed-zero zone, the target traveling course is set outside the entry prohibition zone so as to move the vehicle out of the relative speed-zero zone. Therefore, it is possible to avoid the object without entering in the entry prohibition zone. This makes it possible to realize driving assist which enables a passenger to feel the vehicle-object distance safe.

Preferably, in the present invention, the speed distribution zone includes an overtaking speed distribution zone which defines a distribution of an allowable lower limit of the relative speed of the vehicle with respect to the object existing in the traveling direction of the vehicle and which is required for overtaking the object, wherein the overtaking speed distribution zone ahead of the object is set when the vehicle moves ahead of the object.

According to this feature, when the vehicle moves ahead of the object, the overtaking speed distribution zone is set ahead of the object. Therefore, when the vehicle passes the object laterally and forwardly and enters ahead of the object, the relative speed of the vehicle is controlled in accordance with the allowable lower limit set by the overtaking speed distribution zone. Therefore, in the situation where the vehicle overtakes the object, it is possible to ensure the traveling speed and the vehicle-object distance which allows a driver to feel safe. This makes it possible to realize driving support capable of enabling a driver to feel safe.

Preferably, in the present invention, the entry prohibition zone is set to be more enlarged as a movement speed of the object becomes higher.

According to this feature, the entry prohibition zone is set to be more enlarged as the movement speed of the object becomes higher. Here, it is found that a driver of the vehicle tends to take a larger distance with respect to the object, and drive the vehicle at a lower relative speed with respect to the object as the movement speed of the object becomes higher. Therefore, by setting the entry prohibition zone to be more enlarged as the movement speed of the object becomes higher, it becomes possible to realize driving support capable of enabling a passenger to feel secure and safe.

It is preferred that an amount of enlargement of the entry prohibition zone according to the movement speed of the object is set to be more enlarged at a position ahead of the object than at a position behind the object, as the movement speed of the object becomes higher.

According to this feature, the entry prohibition zone is set to be more enlarged at a position ahead of the object than at a position behind the object, as the movement speed of the object becomes higher. Here, it is found that a driver of the vehicle tends to take a larger distance with respect to the object and drive the vehicle at a lower relative speed with respect to the object as the movement speed of the object becomes higher. Further, as mentioned above, the vehicle-object distance which allows a driver of the vehicle to feel safe is larger when the vehicle travels ahead of the object than when the vehicle travels behind the object. Therefore, the amount of enlargement of the entry prohibition zone is set more largely at a position ahead of the object than at a position behind the object, as the movement speed of the object becomes higher. This makes it possible to realize driving support capable of ensuring the vehicle-object distance conforming to feeling of a passenger to enable the passenger to feel secure and safe.

It is preferred that, when the object is moving along the traveling direction of the vehicle, the amount of enlargement of the entry prohibition zone according to the movement speed of the object is set to be larger in a forward-rearward direction of the object than in a lateral direction of the object.

According to this feature, the entry prohibition zone is set such that it is more enlarged in the forward-rearward direction of the object than in the lateral direction of the object, as the movement speed of the object becomes higher. Here, it is found that the vehicle-object distance necessary for the vehicle to avid collision with the object or allowing a passenger to feel safe is larger when the vehicle approaches the object from the behind or when the vehicle moves ahead of the object than when the vehicle is located laterally beside the object, e.g., in order to pass and overtake the object. Therefore, by setting the amount of enlargement of the entry prohibition zone more largely in the forward-rearward direction of the object than in the lateral direction of the object, it becomes possible to realize driving support capable of ensuring the vehicle-object distances conforming to feeling of a passenger, in each direction, to enable the passenger to feel secure and safe.

It is preferred that the entry prohibition zone is set such that it varies according to the relative speed and the movement speed of the object, wherein the movement speed of the object is weighed more heavily than the relative speed.

According to this feature, the entry prohibition zone is set such that the movement speed of the object is weighed more heavily than the relative speed. Here, it is found that the vehicle-object distance which allows a passenger to feel secure and safe is more dominantly determined by the movement speed of the object than the relative speed between the vehicle and the object. Therefore, by setting the entry prohibition zone such that the movement speed of the object is weighed more heavily than the relative speed, it becomes possible to realize driving support capable of ensuring the vehicle-object distance conforming to feeling of a passenger to enable the passenger to feel secure and safe.

It is preferred that the entry prohibition zone is set as a fixed zone when the movement speed of the object is equal to or less than a given value, and set to be more enlarged than the fixed zone as the movement speed becomes higher when the movement speed of the object is greater than the given value.

According to this feature, the entry prohibition zone is set as a fixed zone without being enlarged according to the movement speed of the object when the movement speed of the object is equal to or less than the given value, and set to be more enlarged as the movement speed becomes higher when the movement speed of the object is greater than the given value. Therefore, by setting the entry prohibition zone as a fixed zone when the movement speed of the object is low, it becomes possible to support secure and safe driving while simplifying control.

Effect of Invention

The present invention can provide a vehicle control system for driving support capable of enabling a driver to feel more secure and safe.

DESCRIPTION OF EMBODIMENTS

Figure 1:
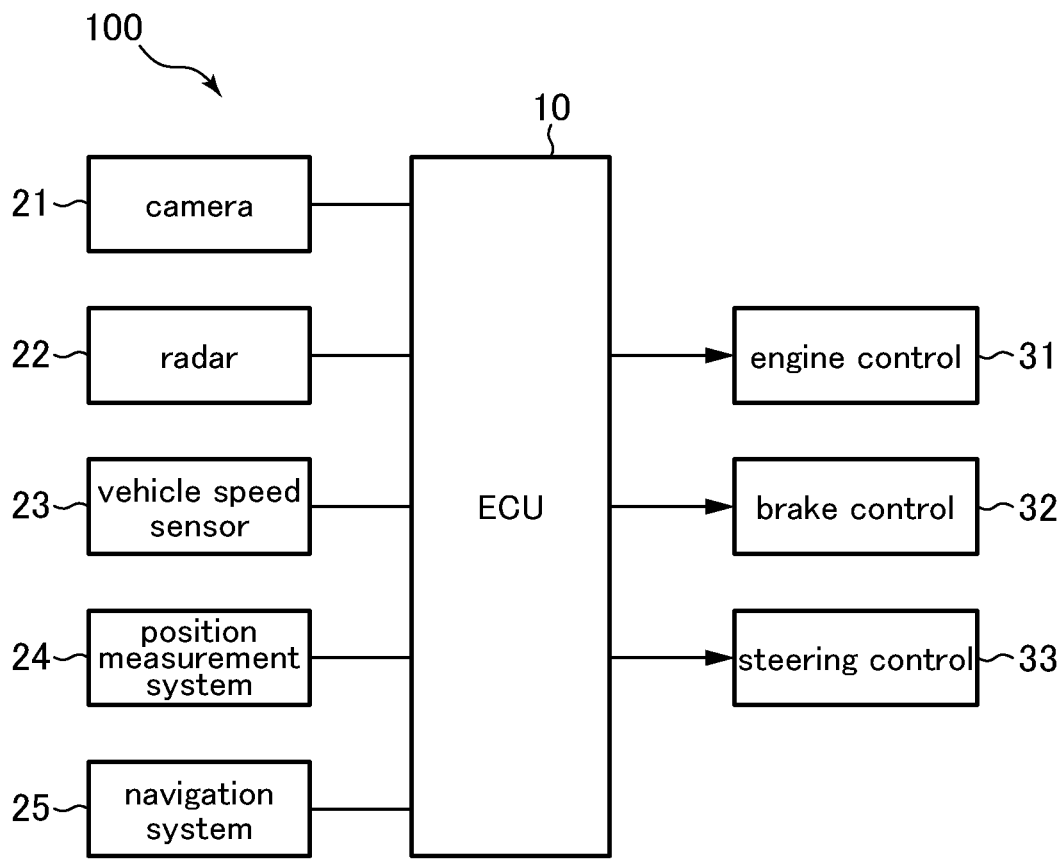
FIG. 1 is a block diagram of a vehicle control system according to a first embodiment of the present invention.

With reference to the accompanying drawings, preferred embodiments of the present invention will now be described. It should be noted here that, in description of a second embodiment and the subsequent description, the similar component or element as that in a first embodiment is assigned with the same reference numerals, and its description will be simplified or omitted.

First Embodiment

With reference to the accompanying drawings, a vehicle control system according to a first embodiment of the present invention will be described. First of all, with reference to FIG. 1, the configuration of the vehicle control system will be described. FIG. 1 is a block diagram of the vehicle control system.

As depicted in FIG. 1, the vehicle control system 100 is provided in a vehicle (own vehicle) 1 (see FIG. 3), and comprises a vehicle control device (ECU) 10, a plurality of sensors, and a plurality of control sub-systems. The plurality of sensors includes a vehicle-mounted camera 21, a millimeter-wave radar 22, a vehicle speed sensor 23, a position measurement system 24, and a navigation system 25. Further, the plurality of control sub-systems includes an engine control system 31, a brake control system 32 and a steering control system 33.

The ECU 10 is composed of a computer comprising a CPU, a memory storing various programs therein, and an input/output device, etc. The ECU 10 is configured to output request signals to the engine control system 31, the brake control system 32 and the steering control system 33 to suitably activate an engine system, a brake system and a steering system, respectively, based on the signals received from the plurality of sensors. For this purpose, the ECU 10 functionally comprises a data acquisition part, an object detection part, a position and relative speed calculation part, a speed distribution zone setting part, a course calculation part, and an avoidance control execution part.

The vehicle-mounted camera 21 takes images around the vehicle 1 and outputs taken image data. The ECU 10 identifies an object (e.g., a preceding vehicle) based on the image data. Here, the ECU 10 is capable of identifying a travelling direction or a forward-rearward direction of the object from the image data.

The millimeter-wave radar 22 is a measurement device for measuring the position and speed of the object, and transmits a radio wave (transmitted wave) to the forward of the vehicle 1 and receive a reflected wave produced as a result of reflection of the transmitted wave by the object. Then, the millimeter-wave radar 22 measures a distance between the vehicle 1 and the object, i.e., a vehicle-object distance, (e.g., inter-vehicle distance) and/or a relative speed of the object with respect to the vehicle 1 based on the transmitted wave and the received wave. In this embodiment, instead of the millimeter-wave radar 22, a laser radar, an ultrasonic sensor or the like may be used to measure the vehicle-object distance and the relative speed. Further, the position and speed measurement device may be composed using a plurality of other sensors.

The vehicle speed sensor 23 calculates an absolute speed of the vehicle 1.

The position measurement system 24 is a GPS system and/or a gyro system, and calculate the position of the vehicle 1 (current vehicle position information).

The navigation system 25 stores map information therein, and provides the map information to the ECU 10. Then, the ECU 10 identifies roads, traffic signals, buildings and others existing around the vehicle 1 (particularly, ahead of the vehicle 1 in the travelling direction) based on the map information and the current vehicle position information. Further, the ECU 10 may identify a landform which is difficult to be identified from the image data taken by the vehicle-mounted camera 21, such as a cliff, a trench or a hole based on the map information. The map information may be stored in the ECU 10.

The engine control system 31 is a controller for controlling an engine of the vehicle 1. When there is a need to accelerate or decelerate the vehicle 1, the ECU 10 outputs to the engine control system 31 an engine output change request signal for requesting to change an engine output.

The brake control system 32 is a controller for controlling a braking device of the vehicle 1. When there is a need to decelerate the vehicle 1, the ECU 10 outputs to the brake control system 32 a braking request signal for requesting to generate a braking force to be applied to the vehicle 1.

The steering control system 33 is a controller for controlling a steering device of the vehicle 1. When there is a need to change the travelling direction of the vehicle 1, the ECU 10 outputs to the steering control system 33 a steering direction change request signal for requesting to change a steering direction.

Next, speed control according to this embodiment in the vehicle control system 100 will be described.

Generally, when catching up with, or passing (or overtaking) an object (e.g., a preceding vehicle, a parked vehicle, or a guardrail) on or near a road, a driver of the vehicle keeps a given distance or clearance between the vehicle and the object in a travelling direction of the vehicle, and reduces the speed of the vehicle. Specifically, in order to avoid dangers such as a situation where a preceding vehicle suddenly changes a course, a situation where a pedestrian comes out from a blind spot along the road, and a situation where a door of a parked vehicle is suddenly opened, the relative speed with respect to the object is set to a lower value as the distance with respect to the object (vehicle-object distance) becomes smaller.

Further, generally, when the vehicle is approaching the object such as a preceding vehicle, from behind the object, the driver of the vehicle adjusts the vehicle speed (relative speed) according to the vehicle-object distance (longitudinal distance) along the travelling direction. Specifically, when the vehicle-object distance is large, an approaching speed (relative speed) is maintained high. However, when the vehicle-object distance becomes relatively small, the approaching speed is set to a lower value. Subsequently, at a given vehicle-object distance, the relative speed between the vehicle and the object becomes zero. This action is taken not only when the object is a preceding vehicle, but also when the object is a parked vehicle, a guardrail or the like.

As above, the driver drives the vehicle in such a manner so as to avoid dangers by ensuring the vehicle-object distance (including a lateral distance and a longitudinal distance) and the relative speed which allow the driver to feel that he/she can drive the vehicle safely with respect to the object, while taking into account a relationship between the vehicle-object distance and the relative speed.

Figure 2:
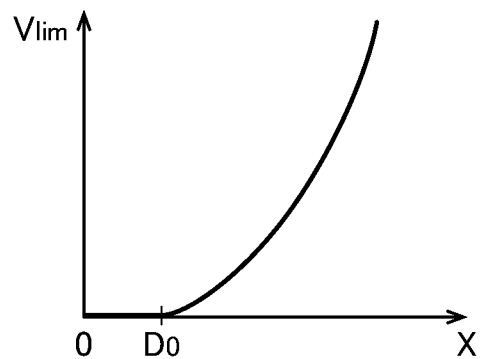
FIG. 2 is a graph presenting a relationship between an allowable upper limit of a relative speed of an own vehicle with respect to a target vehicle and their clearance, in the first embodiment.

FIG. 2 is an explanatory diagram depicting a relationship between an allowable upper limit of the relative speed with respect to the object and the vehicle-object distance (clearance), in the vehicle control system 100 according to this embodiment. As depicted in FIG. 2, when the vehicle 1 travels at a certain absolute speed, the allowable upper limit $V_{lim}$ set with respect to the object is 0 (zero) km/h when the vehicle-object distance X is less than to $D_0$ (safe distance), and quadratically increases when the vehicle-object distance X is equal to or greater than $D_0$ ($V_{lim}=k_0(X-D_0)^2$, where $X \geq D_0$). That is, for the purpose of ensuring safety, the relative speed of the vehicle 1 is set to zero when the vehicle-object distance X is equal to or less than $D_0$. On the other hand, when the vehicle-object distance X is equal to or larger than $D_0$, the vehicle 1 is capable to travel at a higher relative speed as the vehicle-object distance becomes larger.

In the example depicted in FIG. 2, the allowable upper limit with respect to the object is defined as $V_{lim}=f(X)=k_0(X-D_0)^2$. In this formula, $k_0$ denotes a gain coefficient related to the degree of change in $V_{lim}$ with respect to X, wherein $k_0$ is set depending on a type of the object, or the like.

In this embodiment, $V_{lim}$ is defined such that it includes the safe distance and is a quadratic function of X. Alternatively, $V_{lim}$ may be defined as another function (e.g., a linear function). Further, the allowable upper limit $V_{lim}$ may be set in a lateral direction or a longitudinal direction (forward or rearward direction) of the object, or may be set in all radial directions about the object. In doing so, the coefficient $k_0$ and the safe distance $D_0$ may be set with respect to the directions extending from the object.

In this embodiment, considering the allowable upper limit $V_{lim}$ as described above, the vehicle 1 is configured to set, in a region around the object (such as a preceding vehicle, a parked vehicle, a pedestrian, or a guardrail) detected by the vehicle 1, a two-dimensional distribution zone (speed distribution zone 40) defining the allowable upper limit of the relative speed in the travelling direction of the vehicle 1 with respect to the object.

Figure 3:
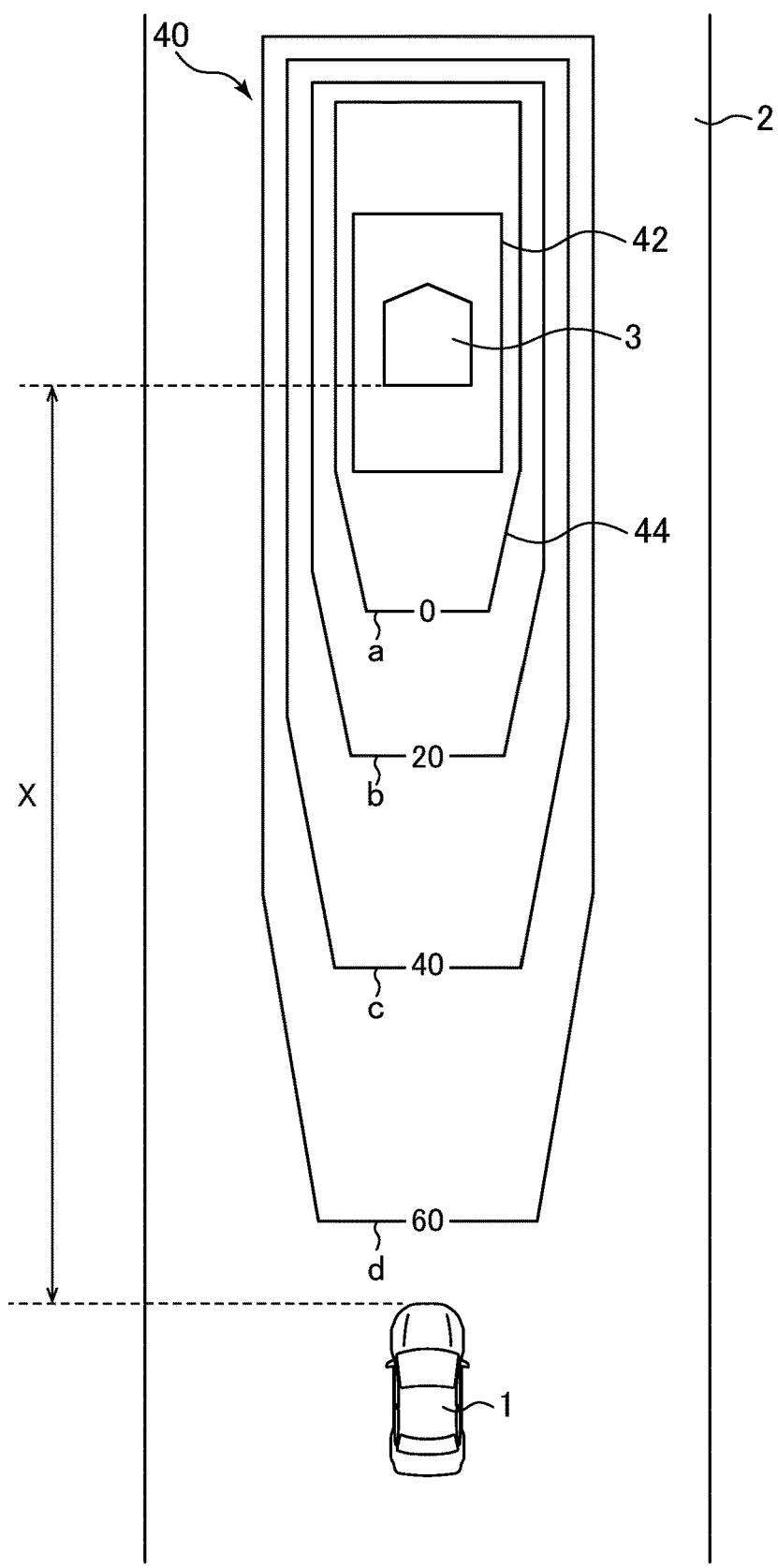
FIG. 3 is a diagram depicting a speed distribution zone set relative to the target vehicle in the first embodiment.

FIG. 3 is an explanatory diagram of a speed distribution zone set with respect to a preceding vehicle 3 during a normal traveling by the vehicle control system according to the first embodiment. As depicted in FIG. 3, in the speed distribution zone 40, the allowable upper limit $V_{lim}$ of the relative speed is set at each point around the preceding vehicle 3. That is, in the speed distribution zone 40, the allowable upper limit $V_{lim}$ of the relative speed is set over a region around the preceding vehicle 3 (in forward, lateral and rearward regions all around the preceding vehicle 3). During operation of the vehicle control system, the relative speed of the vehicle 1 with respect to the preceding vehicle 3 is restricted by the allowable upper limit $V_{lim}$ set within the speed distribution zone 40.

In the speed distribution zone 40, the allowable upper limit of the relative speed is set to be smaller as the lateral distance and the longitudinal distance from the preceding vehicle 3 become smaller (as the vehicle 1 approaches the preceding vehicle 3 more closely). In FIG. 3, for the sake of facilitating understanding, constant relative speed lines each connecting the same allowable upper limits are depicted. In this embodiment, the constant relative speed lines a, b, c, d correspond to lines on which the allowable upper limit $V_{lim}$ is 0 km/h, 20 km/h, 40 km/h and 60 km/h, respectively.

Further, FIG. 3 depicts the speed distribution zone 40 in which the allowable upper limit is up to 60 km/h. However, the speed distribution zone 40 may be expanded to cover a higher relative speed.

Within this speed distribution zone 40, in a region around the preceding vehicle 3 inside the constant relative speed line a on which the allowable upper limit $V_{lim}$ is 0 km/h, an entry prohibition zone 42 in which entry of the vehicle 1 thereinto is prohibited, i.e., across which the vehicle 1 cannot further approach the preceding vehicle 3 is set.

Further, in a region outside the entry prohibition zone 42 and inside the constant relative speed line a on which the allowable upper limit $V_{lim}$ is 0 km/h, a relative speed-zero zone 44 in which the allowable upper limit $V_{lim}$ of relative speed between the vehicle 1 and the preceding vehicle 3 is restricted to 0 km/h is set.

Here, the entry prohibition zone 42 and the relative speed-zero zone 42 will be described in detail.

Figure 4:
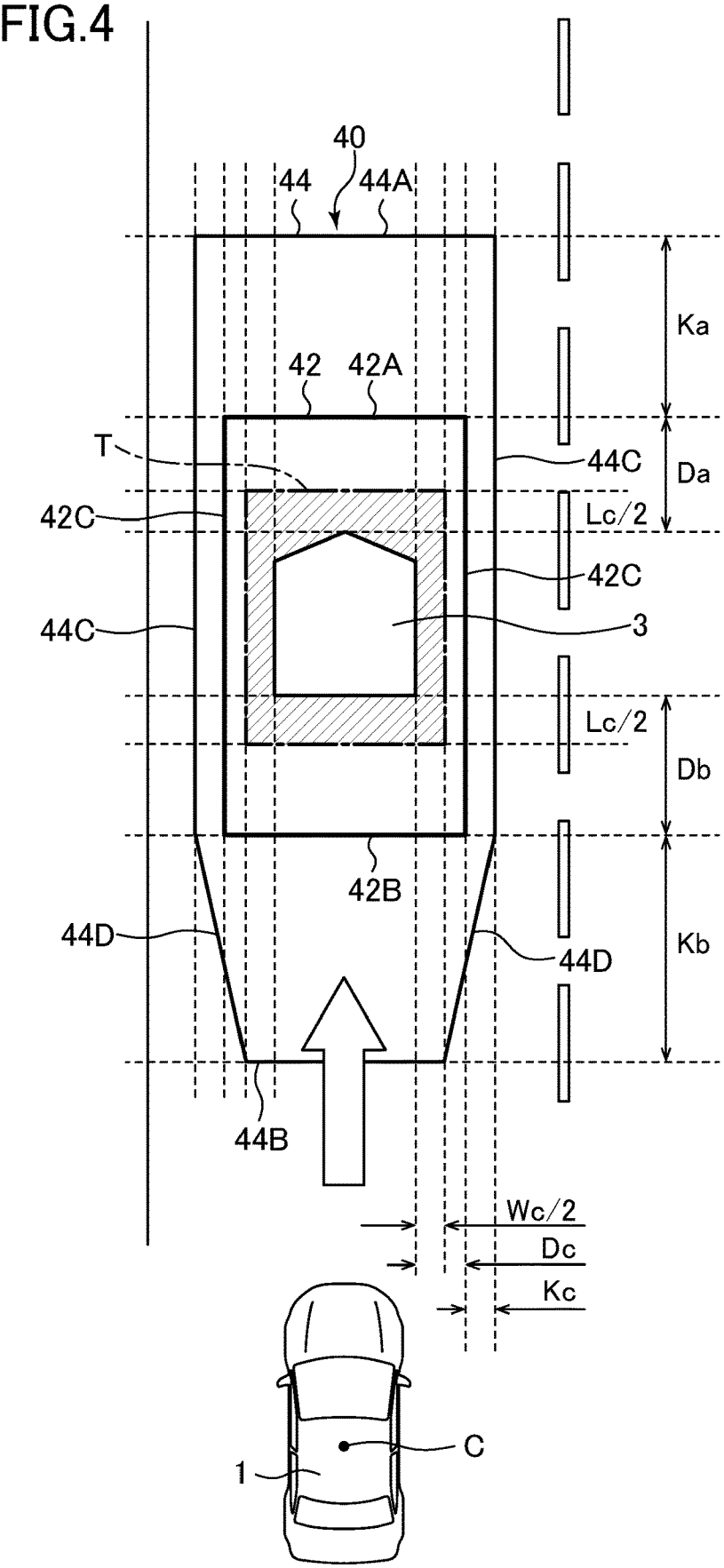
FIG. 4 is a diagram depicting a relative speed-zero zone and an entry prohibition zone of the speed distribution zone in the first embodiment.

FIG. 4 is a diagram depicting the entry prohibition zone 42 and the relative speed-zero zone 44 of the speed distribution zone 40. As depicted in FIG. 4, the entry prohibition zone 42 is a rectangular zone set around (all around) the preceding vehicle 3. The vehicle 3 is controlled so as not to enter the entry prohibition zone 42 in any situation. That is, the vehicle control system 100 is configured to perform braking control and/or steering control to set a target traveling course outside the entry prohibition zone 42 or decelerate the vehicle 1 outside the entry prohibition zone 42 to prevent the vehicle 1 from entering the entry prohibition zone 42 during collision avoidance control.

The entry prohibition zone 42 is a zone surrounded by: a front boundary line 42A set ahead of the preceding vehicle 3 to serve as a front edge of the entry prohibition zone 42; a rear boundary line 42B set behind the preceding vehicle 3 to serve as a rear edge of the entry prohibition zone 42; and lateral boundary lines 42C set on right and left sides of the preceding vehicle 3 respectively to serve as lateral edges of of the entry prohibition zone 42.

The front boundary line 42A of the entry prohibition zone 42 is set at a position away from a front end of the preceding vehicle 3 by a given forward distance Da. The given forward distance Da is determined by the following formula (1).

$$Da = Lc/2 + k_1 Vp + k_2 \quad (1)$$

In the formula (1), Lc denotes a longitudinal length (m) of the vehicle 1, and Vp denotes a traveling speed (m/s) of the preceding vehicle 3. Further, $k_1$ and $k_2$ denote constants. In this embodiment, $k_1$ and $k_2$ are set, respectively, to 0.5 and 5.

In this embodiment, the vehicle control system 100 is configured to recognize a center C of the vehicle 1 as the position of the vehicle 1. Therefore, in this embodiment, the given forward distance Da is calculated as a distance from the front end of the preceding vehicle 3 to the center C of the vehicle 1, by adding the term Lc/2 in the above formula (1), i.e., adding a length from the center C of the vehicle 1 to a rear end of the vehicle 1. Thus, for example, in a case where the given forward distance Da for determining the front boundary line 42A of the entry prohibition zone 42 is set as a distance from the front end of the preceding vehicle 3 to the rear end of the vehicle 1, the given forward distance Da is expressed as follows: $Da = k_1 Vp + k_2$.

In FIG. 4, positions at one-half (Lc/2) of the longitudinal length Lc from the front end and the rear end of the preceding vehicle 3, and positions at one-half (Wc/2) of a lateral length Wc of the vehicle 1 from the lateral ends of the preceding vehicle 3, are indicated as a rectangular-shaped contact zone T surrounded by the dash-dotted line.

The rear boundary line 42B of the entry prohibition zone 42 is set at a position away from the rear end of the preceding vehicle 3 by a given rearward distance Db. The given forward distance Da is determined by the following formula (2).

$$Db = Lc/2 + k_3 \quad (2)$$

In the formula (2), $k_3$ denotes a constant. In this embodiment, $k_3$ is set to 2.

In this embodiment, the vehicle control system 100 is configured to recognize the center C of the vehicle 1 as the position of the vehicle 1, as mentioned above. Therefore, in the formula (2), the given rearward distance Db is set as a distance from the rear end of the preceding vehicle 3 to the center C of the vehicle 1. Thus, for example, in a case where the given rearward distance Db for determining the rear boundary line 42B of the entry prohibition zone 42 is set as a distance from the rear end of the preceding vehicle 3 to the front end of the vehicle 1, the given rearward distance Db is expressed as follows: $Db = 2$.

As above, in this embodiment, the given rearward distance Db for determining the rear boundary line 42B of the entry prohibition zone 42 is a constant value. However, it may be set to be variable according to the traveling speed of the vehicle 1, the traveling speed of the preceding vehicle 3, or the like.

Each of the lateral boundary lines 42C of the entry prohibition zone 42 is set at a position away from a lateral end of the preceding vehicle 3 by a given lateral distance Dc. The given lateral distance Dc is determined by the following formula (3).

$$Dc = Wc/2 + k_4 Vp + k_5 \quad (3)$$

In the formula (3), Wc denotes a lateral length (m) of the vehicle 1, and Vp denotes the traveling speed (m/s) of the preceding vehicle 3. Further, $k_4$ and $k_5$ denote constants. In this embodiment, $k_4$ and $k_5$ are set, respectively, to 0.1 and 0.5.

In this embodiment, the vehicle control system 100 is configured to recognize the center C of the vehicle 1 as the position of the vehicle 1, as mentioned above. Therefore, in the formula (3), the given lateral distance Dc is set as a distance from the lateral end of the preceding vehicle 3 to the center C of the vehicle. Thus, for example, in a case where the given lateral distance Dc for determining the lateral boundary line 42C of the entry prohibition zone 42 is set as a distance from the lateral end of the preceding vehicle 3 to the lateral end of the vehicle 1, the given lateral distance Dc is expressed as follows: $Dc = k_4 Vp + k_5$.

Here, each of the given forward distance Da, the given rearward distance Db and the given lateral distance Dc corresponds to the safe distance $D_0$ described in connection with FIG. 2. However, each of these distances Da, Db, Dc is not set merely as an inter-vehicle distance allowing the vehicle 1 to avoid collision with the preceding vehicle 3, but set as an inter-vehicle distance allowing a passenger of the vehicle 1 to feel safe.

Further, comparting the formula (1) with the formula (2), the forward distance Da of the entry prohibition zone 42 is set such that it is always larger than the rearward distance Db.

Further, as presented in the formula (1) and the formula (3), each of the forward distance Da and the lateral distance Dc is set such that it changes according to the traveling speed of the preceding vehicle 3. More specifically, each of the forward distance Da and the lateral distance Dc is set such that it becomes larger as the traveling speed Vp of the preceding vehicle 3 becomes higher.

Next, the relative speed-zero zone 44 will be described. As depicted in FIG. 4, the relative speed-zero zone 44 is formed in a shape of a combination of a front-side rectangular sub-zone and a rear-side trapezoidal sub-zone. In this embodiment, the vehicle control system 100 restricts the upper limit of the relative speed of the vehicle 1 with respect to the preceding vehicle 3 to 0 (zero) when the vehicle 1 is within the relative speed-zero zone 44. More specifically, in this embodiment, the vehicle control system 100 is configured to execute braking control to the vehicle 1, such that the relative speed between the vehicle 1 and the preceding vehicle 3 becomes negative, i.e., the traveling speed of the vehicle 1 becomes lower than the traveling speed of the preceding vehicle 3 when the vehicle 1 enters the relative speed-zero zone 44 for some reason. Through this braking control, when entering the relative speed-zero zone 44, the vehicle is controlled to move out of the relative speed-zero zone 44, i.e., move away from the preceding vehicle 3.

The relative speed-zero zone 44 is a zone surrounded by: a front boundary line 44A set ahead of the preceding vehicle 3 to serve as a front edge of the relative speed-zero zone 44; a rear boundary line 44B set behind the preceding vehicle 3 to serve as a rear edge of the relative speed-zero zone 44; lateral boundary lines 44C set on right and left sides of the preceding vehicle 3 to serve as lateral edges of of the relative speed-zero zone 44, and rear inclined lines 44D each obliquely connecting a respective one of the lateral boundary lines 44C and the rear boundary line 44B.

The front boundary line 44A of the relative speed-zero zone 44 is set at a position away from the front boundary line 42A of the entry prohibition zone 42 forwardly by a given forward distance Ka. The given forward distance Ka is determined by the following formula (4).

$$Ka = k_6 \times (Vp - Vc) + k_7, \text{ where } Ka \geq 0 \quad (4)$$

In the formula (4), Vc denotes the traveling speed (m/s) of the vehicle 1, and $k_6$ and $k_7$ denote constants. In this embodiment, $k_6$ and $k_7$ are set, respectively, to 1 and 20. Further, in a case where the traveling speed Vc of the vehicle is greater than the traveling speed Vp of the preceding vehicle 3, and thereby Ka has a negative value, Ka is set to 0.

The rear boundary line 44B of the relative speed-zero zone 44 is set at a position away from the rear boundary line 42B of the entry prohibition zone 42 rearwardly by a given rearward distance Kb. The given rearward distance Kb is determined by the following formula (5).

$$Kb = (THW \text{ or } TTC) \times Vc + k_8 \quad (5)$$

In the formula (5), THW is referred as Time-Headway, and represented with a time period from a time when the preceding vehicle 3 passes a certain point to a time when the vehicle 1 passes the point. Further, TTC is referred as Time-To-Collision, and represented with a time period before the vehicle 1 and the preceding vehicle 3 collide with each other under the condition that a current relative speed therebetween is maintained, i.e., a value obtained by dividing an inter-vehicle distance between the vehicle 1 and the preceding vehicle 3 by the relative speed therebetween. In this embodiment, with regard to the term (THW or TTC), a larger one of the time headway and the time-to-collision is taken. Further, $k_8$ is a constant. In this embodiment, $k_8$ is set to 2.

Each of the lateral boundary lines 44C of the relative speed-zero zone 44 is set at a position away from a corresponding one of the lateral boundary lines 42C of the entry prohibition zone 42 laterally by a given lateral distance Kc. The given lateral distance Kc is determined by the following formula (6).

$$Kc = \sqrt{\left(\frac{(Vc - V)}{k_9} + (Dc - Wc/2)^2\right)} \quad (6)$$

In the formula (6), (Dc−Wc/2) represents a lateral distance from the entry prohibition zone 42 to the contact zone T. Thus, considering the formula (3), the given lateral distance Kc can be expressed as follows.

$$Kc = \sqrt{\left(\frac{(Vc - Vp)}{k_9} + (k_4 Vp + k_5)^2\right)} \quad (7)$$

In the formulas (6) and (7), $k_9$ is a constant. In this embodiment, $k_9$ is set to 3.29.

Each of the rear inclined lines 44D of the relative speed-zero zone 44 is represented with a line connecting an intersection point between a corresponding one of the lateral boundary lines 44C of the relative speed-zero zone 44 and the rear boundary line 42B of the entry prohibition zone 42, and an intersection point between the rear boundary line 44B of the relative speed-zero zone 44 and a corresponding one of two lateral boundary lines of the contact zone T.

It should be noted here that, instead of the above calculation method, the speed distribution zone 40 can be set based on various parameters. Examples of such parameters may include the relative speed between the vehicle 1 and the object, the type of the object, the travelling direction of the vehicle 1, the travelling direction and the moving speed of the object, the length of the object, the absolute speed of the vehicle 1. Specifically, a coefficient k and a calculation formula may be selected based on these parameters.

Further, the speed distribution zone 40 can be set with respect to various objects. Examples of the objects include a vehicle, a pedestrian, a bicycle, a travelling path partition member, an obstacle, a traffic signal, and a traffic sign. The vehicle can be identified between a passenger vehicle, a truck, and a motorcycle. The pedestrian can be identified between an adult, a child and a group. Examples of the travelling path partition member include a guardrail, a road shoulder forming a step at a lateral edge of a traveling road, a center median, and a lane line. Examples of the obstacle include a cliff, a trench, a hole and a fallen object. Examples of the traffic sign include a halt line and a halt sign.

Figure 5:
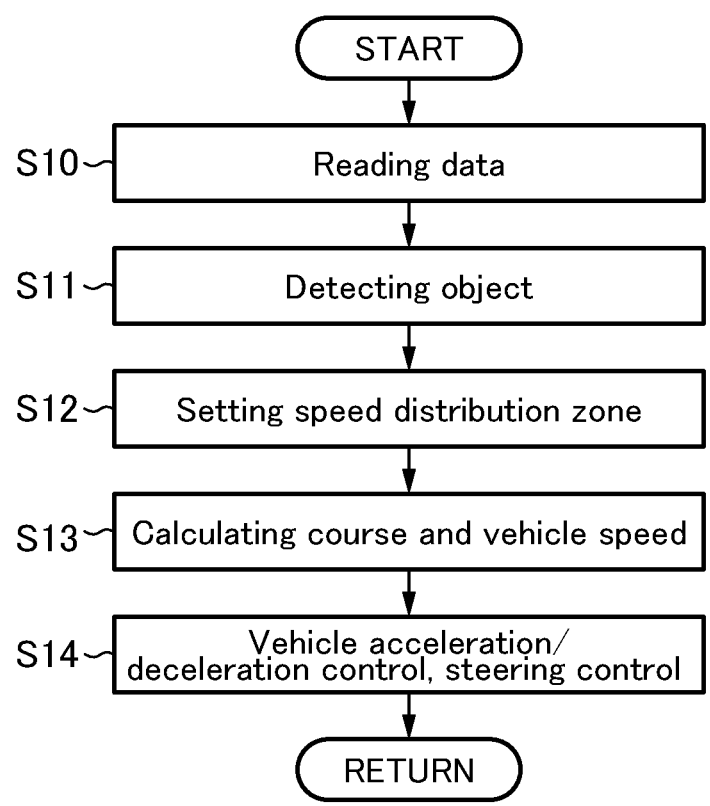
FIG. 5 is a flow chart of processing by the vehicle control system according to the first embodiment.
Figure 6:
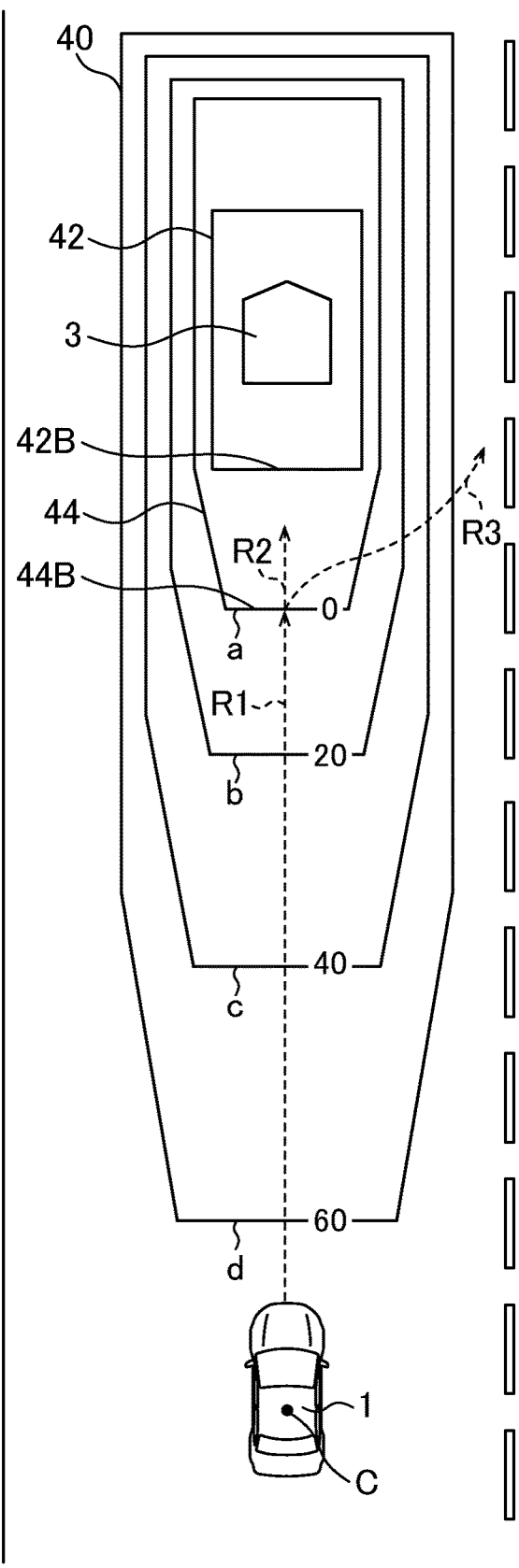
FIG. 6 is an explanatory diagram of actions of the vehicle control system according to the first embodiment.

Next, with reference to FIGS. 5 and 6, a flow of processing to be executed by the vehicle control system according to this embodiment will be described. FIG. 5 is a flow chart of processing by the vehicle control device and FIG. 6 is is an explanatory diagram of actions of the vehicle control system.

As presented in FIG. 5, when the vehicle 1 is travelling on a travelling road, the ECU 10 (data acquisition part) of the vehicle 1 acquires a variety of data from the plurality of sensors (S10). Specifically, the ECU 10 receives from the vehicle-mounted camera 21 image data of a view in front of the vehicle 1 taken by the vehicle-mounted camera 21, and receives measurement data from the millimeter-wave radar 22.

The ECU 10 (object detection part) processes data acquired from external sensors including at least the vehicle-mounted camera 21 to detect an object (S11). Specifically, the ECU 10 executes image processing for the image data to detect a preceding vehicle 3 as the object. Simultaneously, the type of the objects (in this case, vehicle) is identified. Further, the ECU 10 may be configured to detect the presence of a specific obstacle from the map information.

Further, the ECU 10 (position and relative speed calculation part) calculates the position and the relative speed of the detected object (preceding vehicle 3) with respect to the vehicle 1 based on the measurement data. Here, the position of the object includes a longitudinal position (longitudinal distance) along the traveling direction of the vehicle 1, and a lateral position (lateral distance) along the lateral direction orthogonal to the traveling direction. A relative speed contained in the measurement data may be directly used as the relative speed, or a component of velocity along the traveling direction may be calculated from the measurement data. Further, although a component of velocity orthogonal to the travelling direction does not necessarily need to be calculated, it may be estimated from plural pieces of measurement data and/or plural pieces of image data, as needed.

The ECU 10 (speed distribution zone setting part) sets a speed distribution zone 40 with respect to the detected object (i.e., the preceding vehicle 3) (S12). Then, the ECU 10 (course calculation part) calculates a course along which the vehicle 1 can travel, and a setup vehicle speed or target speed at each position on the course (S13) based on the set speed distribution zone 40. Then, in order to enable the vehicle 1 to travel along the calculated course, the ECU 10 (travel control execution part) executes travel control (S14).

The processing flow in FIG. 5 is repeatedly executed at intervals of a given time period (e.g., 0.1 seconds). Thus, the course and the setup speed at each position on the course to be calculated will change with time.

Here, the speed control of the vehicle 1 in a situation where the vehicle 1 approaches the preceding vehicle 3 from the behind will be described.

As indicated by a course R1 in FIG. 6, when the vehicle 1 approaches the preceding vehicle 3 from the behind, the vehicle 1 travels across the constant relative speed lines d, c, b of the speed distribution zone 40. In this situation, for example, assuming that the vehicle 1 is traveling at 60 km/h, the vehicle 1 can maintain this traveling speed before the constant relative speed line d. However, after the vehicle 1 moves beyond the constant relative speed line d, the allowable upper limit $V_{lim}$ gradually decreases, so the vehicle control system 100 outputs the braking request signal to the brake control system 32 to decelerate the vehicle 1, thereby controlling the vehicle 1 to prevent the vehicle speed thereof from exceeding the allowable upper limit $V_{lim}$ set at each point on the course.

When the vehicle 1 reaches an outer boundary, specifically the rear boundary line 44B, of the relative speed-zero zone 44, the vehicle 1 is controlled such that the relative speed between the vehicle 1 and the preceding vehicle 3 becomes 0 (zero). Thus, in a normal driving state, the vehicle 1 does not approach the preceding vehicle 3 any more.

However, for example, when the preceding vehicle 3 is unexpectedly decelerated, the vehicle 1 may enter the relative speed-zero zone 44. In this situation, the vehicle control system 100 controls the vehicle 1 so as to move the vehicle 1 out of the relative speed-zero zone 44. More specifically, the vehicle control system 100 outputs the braking request signal such that the relative speed between the vehicle 1 and the preceding vehicle 3 becomes negative, i.e., becomes less than 0 km/h, thereby controlling the vehicle 1 to move away from the preceding vehicle 3.

Further, when the vehicle 1 enters the relative speed-zero zone 44, the vehicle control system 100 controls the speed and/or the traveling course of the vehicle 1 to prevent the vehicle 1 from entering the entry prohibition zone 42. Specifically, as indicated by a course R2 in FIG. 6, the vehicle control system 100 determines a braking force for the vehicle 1 such that the vehicle 1 travels outside (behind) the rear boundary line 42B of the entry prohibition zone 42 without moving beyond the rear boundary line 42B, and output the braking request to the brake control system. As a result, although the vehicle 1 most closely approaches the preceding vehicle 3 at a position outside the entry prohibition zone 42, the vehicle 1 does not approach the preceding vehicle 3 any more and does not enter the entry prohibition zone 42.

Further, the vehicle control system 100 may be configured to perform, in addition to the speed control, the steering control so as to avoid collision with the preceding vehicle 3, for example, when there is a sufficient space on the lateral side of the preceding vehicle 3. In this case, the vehicle control system 100 may be configured to set the traveling course outside the entry prohibition zone 42, for example, as indicated by a course R3 in FIG. 6.

The vehicle control system according to the first embodiment can bring out the following advantageous effects.

The speed distribution zone 40 includes the entry prohibition zone 42 and the relative speed-zero zone, so, in a normal driving state, the vehicle 1 maintains the relative speed relative to the preceding vehicle 3 at zero at a position of the outer boundary of the relative speed-zero zone 44. Thus, the vehicle control system 100 enables the vehicle 1 to travel while keeping a given distance with respect to the preceding vehicle 3, whereby it is possible to support driving safely.

Further, even in the situation where, due to unexpected deceleration of the preceding vehicle 3, the vehicle 1 enters the relative speed-zero zone 44 and further approaches the preceding vehicle 3, the vehicle control system 100 executes acceleration-deceleration/steering control to prevent the vehicle 1 from entering the entry prohibition zone 42. Therefore, when executing collision avoidance control, it is possible to ensure a given distance between the vehicle 1 and the preceding vehicle 3. This makes it possible to prevent a passenger to feel less secure and support secure and safe driving.

The speed distribution zone 40 is set behind the preceding vehicle 3 such that the allowable upper limit becomes lower as the distance between the vehicle 1 and the preceding vehicle 3 becomes smaller. Thus, when the vehicle 1 approaches the preceding vehicle 3 from the behind, the allowable upper limit becomes lower as the vehicle 1 moves closer to the preceding vehicle 3. Therefore, it is possible to prevent the vehicle 1 from approaching the preceding vehicle 3 at a speed causing a passenger to feel less secure, thereby realizing driving support which enables the vehicle 1 to travel at a speed allowing the passenger to feel safe.

Further, the speed distribution zone 40 is set laterally (widthwisely) beside the preceding vehicle 3 such that the allowable upper limit becomes lower as the distance between the vehicle 1 and the preceding vehicle 3 becomes smaller. Thus, when the vehicle 1 passes or overtakes the preceding vehicle 3, the allowable upper limit becomes lower as the vehicle 1 moves closer to the preceding vehicle 3. Therefore, it is possible to prevent the vehicle 1 from passing or overtaking the preceding vehicle 3 at a speed causing a passenger to feel less secure. This makes it possible to realize driving support enabling the vehicle 1 to travel at a speed allowing the passenger to feel safe.

When the vehicle 1 enters the relative speed-zero zone 44 due to unexpected deceleration of the preceding vehicle 3, the vehicle control system 100 controls the vehicle 1 to move away from the preceding vehicle 3 and move out of the relative speed-zero zone 44. Thus, even when there is an unexpected action of the preceding vehicle 3, it is possible to ensure a given distance between the vehicle 1 and the preceding vehicle 3. This makes it possible to realize driving support capable of enabling a passenger to feel safe in terms of the distance between the vehicle 1 and the preceding vehicle 3.

When the vehicle 1 enters the relative speed-zero zone 44, the target traveling course may be set outside the entry prohibition zone 42 such that the vehicle 1 moves out of the relative speed-zero zone 44. In this case, it is possible to avoid collision with the preceding vehicle 3 while preventing the vehicle 1 from entering the entry prohibition zone 42. This makes it possible to realize driving support for collision avoidance, which enables a passenger to feel safe in terms of the distance between the vehicle 1 and the preceding vehicle 3.

Second Embodiment

Next, a vehicle control system according to a second embodiment of the present invention will be described. Except that setting of the rear boundary line 42B of the entry prohibition zone 42 is different from that in the vehicle control system according to the first embodiment, the vehicle control system according to a second embodiment has the similar configuration as that of the vehicle control system according to the first embodiment.

In the second embodiment, the rear boundary line 42B of the entry prohibition zone 42 is set at a position away from the rear end of the preceding vehicle 3 by a given rearward distance Db. The given rearward distance Db is determined by the following formula (8).

$$Db = Lc/2 + k_{10}Vp + k_3 \quad (8)$$

In the formula (8), $k_{10}$ denotes a constant. In this embodiment, $k_{10}$ is set to 0.3. Here, $k_3$ is set to 2, as in the first embodiment.

In the second embodiment, the vehicle control system 100 is configured to recognize the center C of the vehicle 1 as the position of the vehicle 1, as in the first embodiment. Therefore, in the formula (8), the given rearward distance Db is set as a distance from the rear end of the preceding vehicle 3 to the center C of the vehicle 1. Thus, for example, in a case where the given rearward distance Db for determining the rear boundary line 42B of the entry prohibition zone 42 is set as a distance from the rear end of the preceding vehicle 3 to the front end of the vehicle 1, the given rearward distance Db is expressed as follows: $Db = k_{10}Vp + k_3$.

Here, each of the given forward distance Da, the given rearward distance Db and the given lateral distance Dc corresponds to the safe distance $D_0$ described in connection with FIG. 2. Each of these distances Da, Db, Dc is not set merely as an inter-vehicle distance allowing the vehicle 1 to avoid collision with the preceding vehicle 3 by braking/steering when the vehicle 1 approaches the preceding vehicle 3, but set as an inter-vehicle distance allowing a passenger of the vehicle 1 to feel safe without feeling fear, when the vehicle 1 approaches the preceding vehicle 3 while avoiding collision with the preceding vehicle 3.

When the vehicle 1 approaches the preceding vehicle 3 from the behind, the preceding vehicle 3 is traveling in a direction away from the vehicle 1, and the vehicle 1 is traveling in a direction approaching the preceding vehicle 3. For this reason, with respect to behavior during collision avoidance between the vehicle 1 and the preceding vehicle 3, behavior of the vehicle 1 is more dominant than that of the preceding vehicle 3, and it is easier for the vehicle 1 to control the distance between the vehicle 1 and the preceding vehicle 3, as compared to for the preceding vehicle 3. Therefore, even if the distance between the vehicle 1 and the preceding vehicle 3 is relatively small, a passenger of the vehicle 1 can feel that it is a safe distance. On the other hand, in a situation where the vehicle 1 travels ahead of the preceding vehicle 3 after overtaking the preceding vehicle 3, a certain time period is required until a driver of the preceding vehicle 3 recognizes the vehicle 1 and drives taking into account the distance and speed with respect to the vehicle 1. For this reason, in order to avoid collision with the preceding vehicle 3, it is necessary to perform the inter-vehicle distance control taking into account the behavior of the preceding vehicle 3 more than the behavior of the vehicle 1. Therefore, unless the distance between the vehicle 1 and the preceding vehicle 3 is relatively large, a passenger of the vehicle 1 cannot feel that it is a safe distance.

In view of the above situations, when setting the distance between the vehicle 1 and the preceding vehicle 3, the inter-vehicle distance needs to be set to a larger value when the vehicle is traveling ahead of the preceding vehicle 3 than when the vehicle is traveling behind the preceding vehicle 3. Therefore, as seen by comparing the formula (1) described in the first embodiment with the formula (8) described in the second embodiment, in the second embodiment, each of $k_1$ and $k_2$ in the formula (1) is set to a larger value than each of $k_{10}$ and $k_3$ in the formula (8). That is, in the second is embodiment, the forward distance Da of the entry prohibition zone 42 is set to be always greater than the rearward distance Db.

Further, as presented in the formulas (1) and (3) described in the first embodiment and the formulas (8) described in the second embodiment, each of the forward distance Da, the rearward distance Db and the lateral distance Dc of the entry prohibition zone 42 is set such that it changes according to the traveling speed Vp of the preceding vehicle 3. More specifically, as the traveling speed Vp of the preceding vehicle 3 becomes higher, each of the given forward distance Da, the given rearward distance Db and the given lateral distance Dc is set to a larger value to enlarge the entry prohibition zone 42.

Here, the coefficient $k_1$ of Vp in the formula (1) is set to be larger than the coefficient $k_{10}$ of Vp in the formula (8). That is, in the second embodiment, as the traveling speed Vp of the preceding vehicle 3 becomes higher, the forward distance Da of the entry prohibition zone 42 set such that it increase at a lager rate than that of the rearward distance Db. In other words, an amount of enlargement of the entry prohibition zone 42 according to the traveling speed Vp of the preceding vehicle 3 is set more largely at a position ahead of the preceding vehicle 3 than at a position behind the preceding vehicle 3.

In a situation where the vehicle 1 is traveling laterally beside the preceding vehicle 3 so as to pass or overtake the preceding vehicle 3, the vehicle 1 is traveling in the same direction as that of the vehicle 1. Therefore, a lateral distance between the vehicle 1 and the preceding vehicle 3 allowing a passenger to feel safe during collision avoidance is relatively small. On the other hand, in a situation where the vehicle 1 is traveling behind or ahead of the preceding vehicle 3, a longitudinal distance between the vehicle 1 and the preceding vehicle 3 allowing the passenger to feel safe during collision avoidance is relatively large. Therefore, in the second embodiment, each of the coefficients $k_1$, $k_{10}$ of Vp in the formulas (1) and (8) is set to be larger than the coefficient $k_5$ of Vp in the formula (3). That is, the amount of enlargement of the entry prohibition zone 42 according to the traveling speed Vp of the preceding vehicle 3 is set more largely in a forward-rearward direction of the preceding vehicle 3 than in a lateral direction of the preceding vehicle 3.

The vehicle control system according to the second embodiment can bring out the following advantageous effects.

The entry prohibition zone 42 is set such that it varies according to the traveling speed Vp of the preceding vehicle 3. More specifically, the entry prohibition zone 42 is set such that it is more enlarged as the traveling speed Vp of the preceding vehicle 3 becomes higher. Here, when ensuring the distance and relative speed between the vehicle 1 and the preceding vehicle 3 which allow a passenger of the vehicle 1 to feel secure and safe, it is found that the inter-vehicle distance and the relative speed which allow the passenger to feel safe vary according to the traveling speed Vp of the preceding vehicle. More specifically, the present inventor found that, as the traveling speed Vp of the preceding vehicle 3 becomes higher, a driver of the vehicle 1 tends to take a larger distance with respect to the preceding vehicle 3, and drive the vehicle 1 at a lower relative speed with respect to the preceding vehicle 3. In the second embodiment, by setting the entry prohibition zone 42 such that it is more enlarged according to the movement speed Vp of the preceding vehicle 3, i.e., as the traveling speed Vp of the preceding vehicle 3 becomes higher, it becomes possible to realize driving assist which ensures the inter-vehicle distance and the relative speed conforming to feeling of a passenger with respect to the preceding vehicle 3 and enables the passenger to feel secure and safe.

The entry prohibition zone 42 is set such that it is more enlarged in the forward-rearward direction of the preceding vehicle 3 than in the lateral direction of the preceding vehicle 3, as the traveling speed Vp of the preceding vehicle 3 becomes higher. That is, the amount of enlargement of the entry prohibition zone 42 according to the traveling speed Vp of the preceding vehicle 3 is set more largely in the forward-rearward direction of the preceding vehicle 3 than in the lateral direction of the preceding vehicle 3. Here, it is found that the inter-vehicle distance necessary for the vehicle 1 to avid collision with the preceding vehicle 3 or allowing a passenger of the vehicle 1 to feel safe is larger when the vehicle 1 approaches the preceding vehicle 3 from the behind or when the vehicle 1 travels ahead of the preceding vehicle 3 after overtaking the preceding vehicle 3 than when the vehicle 1 is located laterally beside the preceding vehicle 3, e.g., in order to pass and overtake the preceding vehicle 3. Therefore, in the second embodiment, by setting the amount of enlargement of the entry prohibition zone 42 more largely in the forward-rearward direction of the preceding vehicle 3 than in the lateral direction of the preceding vehicle 3, it becomes possible to realize driving support which ensures the inter-vehicle distances conforming to feeling of a passenger, in each direction and enables the passenger to feel secure and safe.

The front boundary line 42A is set such that the distance Da from the front end of the preceding vehicle 3 to the front boundary line 42A is greater than the distance Db from the rear end of the preceding vehicle 3 to the rear boundary line 42B. Here, for example, in a situation where the vehicle 1 is traveling behind the preceding vehicle 3, the vehicle 1 will travel to approach the preceding vehicle 3. In this situation, it is easy to control the distance between the vehicle 1 and the preceding vehicle 3 by controlling the traveling speed or traveling course of the vehicle 1. Thus, even when the distance between the vehicle 1 and the preceding vehicle 3 is relatively small, a passenger feels it as a safe distance. On the other hand, in a situation where the vehicle 1 travels ahead of the preceding vehicle 3 after overtaking the preceding vehicle 3, a certain time period is required until a driver of the preceding vehicle 3 recognizes the vehicle 1 and drives taking into account the distance and speed with respect to the vehicle 1. For this reason, in order to enable a passenger of the vehicle 1 to feel the inter-vehicle distance safe, it is necessary to ensure a relatively large distance with respect to the preceding vehicle 3. In the second embodiment, by setting the front boundary line 42A such that the distance Da from the front end of the preceding vehicle 3 to the front boundary line 42A is greater than the distance Db from the rear end of the preceding vehicle 3 to the rear boundary line 42B, it becomes possible to realize driving support which ensures the inter-vehicle distance and the relative speed conforming to feeling of a passenger and enables the passenger to feel secure and safe.

The entry prohibition zone 42 is set such that it varies according to the traveling speed Vp of the preceding vehicle 3. More specifically, the entry prohibition zone 42 is set such that it is more enlarged as the traveling speed Vp of the preceding vehicle 3 becomes higher. Here, when ensuring the distance and relative speed between the vehicle 1 and the preceding vehicle 3 which allow a passenger of the vehicle 1 to feel secure and safe, it is found that the inter-vehicle distance and the relative speed which allow the passenger to feel safe vary according to the traveling speed Vp of the preceding vehicle. More specifically, it is found that, as the traveling speed Vp of the preceding vehicle 3 becomes higher, a driver of the vehicle 1 tends to take a larger distance with respect to the preceding vehicle 3, and drive at a lower relative speed with respect to the preceding vehicle 3. In the second embodiment, by setting the entry prohibition zone 42 such that it is more enlarged according to the movement speed Vp of the preceding vehicle 3, i.e., as the traveling speed Vp of the preceding vehicle 3 becomes higher, it becomes possible to realize driving support which ensures the inter-vehicle distance and the relative speed conforming to feeling of a passenger with respect to the preceding vehicle 3 and enables the passenger to feel secure and safe.

The entry prohibition zone 42 is set such that it is more enlarged at a position ahead of the preceding vehicle 3 than at a position behind the preceding vehicle 3, as the traveling speed Vp of the preceding vehicle 3 becomes higher. Here, as the traveling speed Vp of the preceding vehicle 3 becomes higher, a driver of the vehicle 1 tends to take a larger distance with respect to the preceding vehicle 3, and drive the vehicle 1 at a lower relative speed with respect to the preceding vehicle 3. Further, as mentioned above, the distance between the vehicle 1 and the preceding vehicle 3 which allows a driver of the vehicle 1 to feel safe is larger when the vehicle 1 travels ahead of the preceding vehicle 3 than when the vehicle 1 travels behind the preceding vehicle 3. Therefore, in the second embodiment, the amount of enlargement of the entry prohibition zone 42 is set more largely at a position ahead of the preceding vehicle 3 than at a position behind the preceding vehicle 3, as the traveling speed of the preceding vehicle 3 becomes higher. This makes it possible to realize driving support which ensures the inter-vehicle distance conforming to feeling of a passenger with respect to the preceding vehicle 3 and enables the passenger to feel secure and safe.

Third Embodiment

Next, a vehicle control system according to a third embodiment of the present invention will be described. Except that setting of the speed distribution zone in a situation where the vehicle 1 overtakes the preceding vehicle 3 is different from that in the vehicle control system according to the first embodiment, the vehicle control system according to a third embodiment has the similar configuration as that of the vehicle control system according to the first embodiment.

Figure 7:
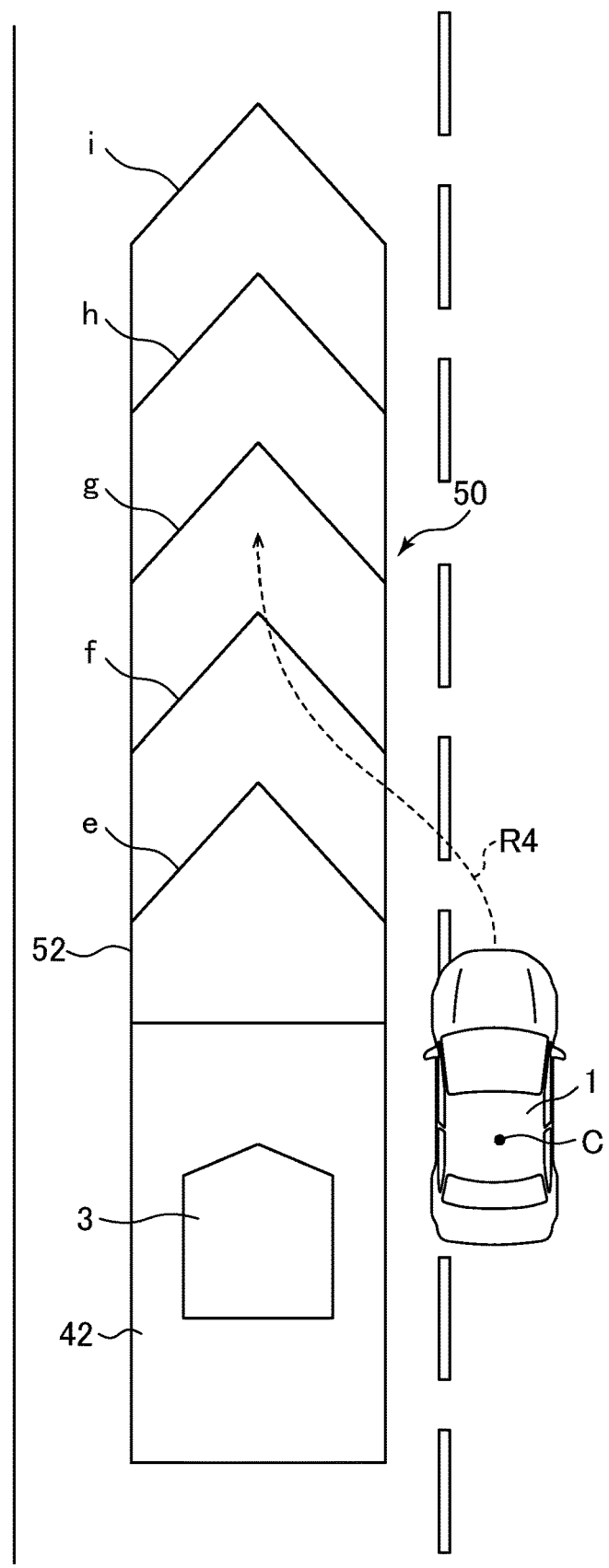
FIG. 7 is a diagram depicting a speed distribution zone set relative to a target vehicle by a vehicle control system according to a third embodiment of the present invention.

FIG. 7 is a diagram depicting a speed distribution zone 50 set to a preceding vehicle by the vehicle control system according to the third embodiment. In the third embodiment, the speed distribution zone 50 includes an overtaking speed distribution zone 52 to be set when the vehicle 1 overtakes the preceding vehicle 3, in addition to the similar entry prohibition zone 42 as that in the first embodiment.

The overtaking speed distribution zone 52 is set ahead of the vehicle 1, more specifically, ahead of the entry prohibition zone 42, and defines a distribution of an allowable lower limit $V_{min}$ of the relative speed of the vehicle 1 with respect to the preceding vehicle 3$t$ in the traveling direction of the vehicle 1. The overtaking speed distribution zone 52 is set to extend forwardly from the front boundary line 42A of the entry prohibition zone 42 with the same width as that of the entry prohibition zone 42, and set such that the allowable lower limit $V_{min}$ becomes larger as a distance from the preceding vehicle 3 in the forward-rearward (longitudinal) direction becomes smaller. Each of a plurality of constant relative speed lines e, f, g, h, i in the overtaking speed distribution zone 52 extends obliquely forwardly from opposite lateral ends to a lateral (width directional) center of the overtaking speed distribution zone 52. In FIG. 7, for the sake of facilitating understanding, constant relative speed lines e, f, g, h, i each connecting the same allowable lower limits $V_{min}$ are depicted. In the third embodiment, the constant relative speed lines e, f, g, h, i correspond, respectively, to lines on which the allowable lower limit $V_{min}$ is 50 km/h, 40 km/h, 30 km/h, 20 km/h and 10 km/h.

When the vehicle 1 is located behind the preceding vehicle 3, the vehicle control system 100 according to the third embodiment sets the speed distribution zone 40 around the preceding vehicle 3 in the same manner as that in the first embodiment. Then, when the vehicle 1 passes or overtakes the preceding vehicle 3, the vehicle control system 100 calculates a possible course along which the vehicle 1 can travel, and a setup vehicle speed or target speed at each point on the course based on the speed distribution zone 40. Then, the ECU 10 is operable to execute traveling control to enable the vehicle 1 to travel along the calculated course.

When the vehicle 1 moves ahead of the preceding vehicle 3 after passing laterally beside the preceding vehicle 3, the vehicle control system 100 switches the speed distribution zone to be set to the preceding vehicle 3 from the speed distribution zone 40 to the speed distribution zone 50. In the third embodiment, the center C of the vehicle 1 is recognized as the position of the vehicle 1. Thus, when the center C of the vehicle 1 is located forward beyond the front end of the preceding vehicle 3 in the traveling direction of the vehicle 1, the vehicle 1 is determined that it has moved ahead the preceding vehicle 3.

When the vehicle 1 performs overtaking, the vehicle control system 100 calculates a possible course (e.g. R4 in FIG. 7) along which the vehicle 1 can travel when moving ahead the preceding vehicle 3 and a setup vehicle speed or target speed at each point on this course based on the overtaking speed distribution zone 52, such that the traveling speed of the vehicle 1 does not fall below the allowable lower limit $V_{min}$ set in the overtaking speed distribution zone 52. Then, the ECU 10 executes the traveling control to control the vehicle 1 to travel along the calculated course.

The vehicle control system 100 according to the third embodiment can bring out the following advantageous effects, in addition to the same effects as those in the first embodiment.

When the vehicle 1 overtakes the preceding vehicle 3 and moves ahead the preceding vehicle 3, the overtaking speed distribution zone 52 is set ahead of the preceding vehicle 52. Therefore, in a situation where the vehicle 1 moves from a position lateral to the preceding vehicle 3 to a position ahead of the preceding vehicle 3, and enters ahead of the preceding vehicle 3, the relative speed of the vehicle 1 with respect to the preceding vehicle 3 is controlled in accordance with the allowable lower limit set in the overtaking speed distribution zone 52. Therefore, when the vehicle 1 overtakes the preceding vehicle 3, the traveling speed and the inter-vehicle distance allowing a drive to feel safe is also ensured with respect to the preceding vehicle 3, so that it becomes possible to realize driving support enabling the driver to feel safe.

It is to be understood that the present invention is not limited to the above embodiments, but various modifications and changes may be made therein, e.g., as follows.

The speed distribution zone is not limited to a zone set all around a preceding vehicle. For example, the speed distribution zone may be set only at a position ahead of the preceding vehicle, as in the third embodiment, or only at positions ahead of and behind the preceding vehicle, or at positions ahead of and behind the preceding vehicle and one of right and left lateral sides of the preceding vehicle, or only at opposite positions lateral to the preceding vehicle, or only a position behind the preceding vehicle, or at least at positions ahead of and behind the preceding vehicle. In sum, the speed distribution zone may be set in at least a part of a region around an object.

In the above embodiments, the entry prohibition zone 42 is set such that it is enlarged according to the traveling speed Vp of the preceding vehicle 3. However, for example, the entry prohibition zone 42 may be set such that it is enlarged according to both the relative speed between the vehicle and an object and a movement speed of the object. More specifically, for example, a distance Da' from the front boundary line as the front edge of the entry prohibition zone to the front end of the preceding vehicle may be set by the following formula.

$$Da' = Lc/2 + k_{11}Vp + k_{12}V_{sop} + k_{13} \quad (9)$$

In the formula (9), $V_{sop}$ denotes the relative speed (m/s) between the vehicle and the preceding vehicle. Further, $k_{11}$, $k_{12}$ and $k_{13}$ denote constants. In this modification, $k_{11}$, $k_{12}$ and $k_{13}$ are set, respectively, to 0.4, 0.1 and 5.

Although the formula (9) is a formula for a forward region of the preceding vehicle, the entry prohibition zone may be set such that a lateral (widthwise) or rearward region thereof is also enlarged according to both the relative speed between the vehicle and an object and a movement speed of the object.

Here, it is found that the vehicle-object distance which allows a passenger to feel secure and safe is more dominantly determined by the movement speed of the object than by the relative speed between the vehicle and the object. Therefore, in the formula (9), the coefficient $k_{11}$ of the traveling speed of the preceding vehicle is set to be greater than the coefficient $k_{12}$ of the relative speed between the vehicle and the object. That is, the entry prohibition zone is set such that the movement speed of the object is weighed more heavily than the relative speed. This makes it possible to realize driving support which ensures the vehicle-object distance more accurately conforming to feeling of a passenger and enables the passenger to feel secure and safe.

In the above embodiments, the entry prohibition zone 42 is set such that all the forward, rearward and lateral regions thereof are enlarged according to the traveling speed Vp of the preceding vehicle 3. However, for example, the rearward region of the entry prohibition zone may be set at a constant distance from the rear end of the preceding vehicle. More specifically, a distance Db' from the rear end of the preceding vehicle to the rear boundary line of the entry prohibition zone may be set by the following formula.

$$Db'=Lc/2+k_{14} \qquad (10)$$

In the formula (10), $k_{14}$ denote a constant. For example, $k_{14}$ may be set to 2.

In sum, the entry prohibition zone may be set such that at least a part thereof is more enlarged as the movement speed of the object becomes higher.

In the above embodiments, the entry prohibition zone 42 is set such that it is enlarged in proportion to the traveling speed Vp of the preceding vehicle 3. However, the entry prohibition zone may be set as a fixed zone when the movement speed of the object is equal to or less than a given value, and set to be more enlarged than the fixed zone as the movement speed becomes higher, e.g., it is enlarged in proportion to the movement speed of the preceding vehicle when the movement speed of the object is greater than a given value. By setting the entry prohibition zone as a fixed zone when the movement speed of the object is relatively low, it becomes possible to support secure and safe driving while simplifying control.

LIST OF REFERENCE SIGNS

1: vehicle
2: traveling road
3: preceding vehicle (object)
21: vehicle-mounted camera
22: millimeter-wave radar
23: vehicle speed sensor
24: position measurement system
25: navigation system
31: engine control system
32: brake control system
33: steering control system
40, 50: speed distribution zone
42: entry prohibition zone
44: relative speed-zero zone
52: overtaking speed distribution zone
100: vehicle control system
a, b, c, d, e, f, g, h, i: constant relative speed line
$D_0$: safe distance
X: clearance
R1, R2, R3, R4: course

The invention claimed is:

1. A vehicle control system which is mounted on a vehicle, and configured to:
   detect an object ahead of the vehicle;
   set a speed distribution zone defining a distribution of an allowable upper limit of a relative speed of the vehicle with respect to the object in a traveling direction of the vehicle in at least a part of a region around the object, the speed distribution zone being set such that the allowable upper limit of the relative speed becomes smaller as a distance relative to the object becomes smaller; and
   execute traveling control of preventing the relative speed of the vehicle with respect to the object from exceeding the allowable upper limit in the speed distribution zone,
   wherein the speed distribution zone includes:
      a relative speed-zero zone which is set at a position away from the object by a given distance and which the allowable upper limit is set to zero therein; and
      an entry prohibition zone which is set at a position between the object and the relative speed-zero zone and in which entry of the vehicle thereinto is prohibited whereby the vehicle cannot further approach the object;
   it is configured to set a target traveling course of the vehicle outside the entry prohibition zone so as to move the vehicle out of the relative speed-zero zone when the vehicle enters the relative speed-zero zone; and
   it is configured to execute the traveling control to move the vehicle along the target traveling course.

2. The vehicle control system as recited in claim 1, wherein the size of the entry prohibition zone is set such that it varies according to a movement speed of the object.

3. The vehicle control system as recited in claim 1, wherein the entry prohibition zone is set both rearwardly and forwardly of the object and is set such that a distance extending rearwardly from a rear end of the object is greater than a distance extending forwardly from a front end of the object.

4. The vehicle control system as recited in claim 1, wherein the speed distribution zone is set for a region behind the object at a position farther away from the object than the relative speed-zero zone, such that the allowable upper limit becomes lower as a longitudinal distance from the object to the vehicle in the traveling direction of the vehicle becomes smaller.

5. The vehicle control system as recited in claim 1, wherein the speed distribution zone is set for a region lateral to the object such that the allowable upper limit becomes lower as a lateral distance from the object to the vehicle existing in the traveling direction of the vehicle becomes smaller.

6. The vehicle control system as recited in claim 1, wherein it is configured to control a traveling speed of the vehicle such that the vehicle moves to a position farther away from the object than the relative speed-zero zone when the vehicle enters the relative speed-zero zone.

7. The vehicle control system as recited in claim 1, wherein the speed distribution zone includes an overtaking speed distribution zone which defines a distribution of an allowable lower limit of the relative speed of the vehicle with respect to the object in the traveling direction of the vehicle and which is required for overtaking the object, and wherein the vehicle control system is configured to set the overtaking speed distribution zone ahead of the object when the vehicle moves ahead of the object.

8. The vehicle control system as recited in claim 1, wherein the entry prohibition zone enlarges, at a position ahead of the object and a position behind the object, in response to an increase in a movement speed of the object, wherein an amount of enlargement at the position ahead of the objection is greater than an amount of enlargement at the position behind the object.

9. The vehicle control system as recited in claim 1, wherein, when the object is moving along the traveling direction of the vehicle, the entry prohibition zone enlarges, in a forward-rearward direction of the object and in a lateral direction of the object, in response to an increase in a movement speed of the object, wherein an amount of enlargement in the forward-rearward direction of the object is greater than an amount of enlargement in the lateral direction of the object.

10. The vehicle control system as recited in claim 1, wherein the entry prohibition zone is set such that it varies according to the relative speed and a movement speed of the object, wherein the movement speed of the object is weighed more heavily than the relative speed.

11. The vehicle control system as recited in claim 1, wherein the entry prohibition zone is set as a fixed zone when a movement speed of the object is equal to or less than a given value, and set to be more enlarged than the fixed zone as the movement speed becomes higher when the movement speed of the object is greater than the given value.

12. A vehicle control system which is mounted on a vehicle, and configured to:
   detect an object ahead of the vehicle;
   set a speed distribution zone defining a distribution of an allowable upper limit of a relative speed of the vehicle with respect to the object in a traveling direction of the vehicle in at least a part of a region around the object, the speed distribution zone being set such that the allowable upper limit of the relative speed becomes smaller as a distance relative to the object becomes smaller; and
   execute traveling control of preventing the relative speed of the vehicle with respect to the object from exceeding the allowable upper limit in the speed distribution zone,
   wherein the speed distribution zone includes:
      a relative speed-zero zone which is set at a position away from the object by a given distance and which the allowable upper limit is set to zero therein; and
      an entry prohibition zone which is set at a position between the object and the relative speed-zero zone and in which entry of the vehicle thereinto is prohibited whereby the vehicle cannot further approach the object;
   the entry prohibition zone is set to be more enlarged as a movement speed of the object becomes higher; and
   the entry prohibition zone is set to be an area surrounded by lateral border lines which are lateral ends of the entry prohibition zone set one the right and left side of the object and is set such that the lateral distance between the lateral border line and the object becomes larger as the movement speed of the object becomes larger.

13. A vehicle control system which is mounted on a vehicle, and configured to:
   detect an object ahead of the vehicle;
   set a speed distribution zone defining a distribution of an allowable upper limit of a relative speed of the vehicle with respect to the object in a traveling direction of the vehicle in at least a part of a region around the object, the speed distribution zone being set such that the allowable upper limit of the relative speed becomes smaller as a distance relative to the object becomes smaller; and
   execute traveling control of preventing the relative speed of the vehicle with respect to the object from exceeding the allowable upper limit in the speed distribution zone,
   wherein the speed distribution zone includes:
      a relative speed-zero zone which is set at a position away from the object by a given distance and which the allowable upper limit is set to zero therein; and
      an entry prohibition zone which is set at a position between the object and the relative speed-zero zone and in which entry of the vehicle thereinto is prohibited whereby the vehicle cannot further approach the object;
   the entry prohibition zone is set to be more enlarged as a movement speed of the object becomes higher; and
   the entry prohibition zone is set to be more enlarged depending on both the relative speed of the vehicle relative to the object in the traveling direction and the movement speed of the object.

14. The vehicle control system as recited in claim 1, wherein the entry prohibition zone is set all around the object.

15. The vehicle control system as recited in claim 12, wherein the entry prohibition zone is set all around the object; and the entry prohibition zone is set to be enlarged in all of front, rear, left and right directions.

16. The vehicle control system as recited in claim 13, wherein the entry prohibition zone is set all around the object; and the entry prohibition zone is set to be enlarged in all of front, rear, left and right directions.

17. The vehicle control system as recited in claim 1, wherein it is configured to determine a braking force to be applied to the vehicle so as to move the vehicle outside a rear border line of the entry prohibition zone and not to exceed it and to output a braking request signal to a brake control system when the vehicle enters the relative speed-zero zone.

18. The vehicle control system as recited in claim 12, wherein it is configured to determine a braking force to be applied to the vehicle so as to move the vehicle outside a rear border line of the entry prohibition zone and not to exceed it and to output a braking request signal to a brake control system when the vehicle enters the relative speed-zero zone.

* * * * *